E. C. TAYLOR.
CARBURETER ADJUSTMENT GAGE.
APPLICATION FILED FEB. 5, 1918.

1,293,577. Patented Feb. 4, 1919.

Inventor
Edward C. Taylor

By
William M. Swan
Attorney

Witness
O. B. Baenziger
J. Engleheart

UNITED STATES PATENT OFFICE.

EDWARD C. TAYLOR, OF HIGHLAND PARK, MICHIGAN.

CARBURETER-ADJUSTMENT GAGE.

1,293,577.   Specification of Letters Patent.   Patented Feb. 4, 1919.

Application filed February 5, 1918. Serial No. 215,467.

*To all whom it may concern:*

Be it known that I, EDWARD C. TAYLOR, a subject of the King of Great Britain and Ireland, residing at Highland Park, county of Wayne, State of Michigan, have invented a certain new and useful Improvement in Carbureter-Adjustment Gages, and declare the following to be a full, clear, and exact description of the same, such as will enable others skilled in the art to which it pertains to make and use the same, reference being had to the accompanying drawings, which form a part of this specification.

This invention relates to gages for indicating the degree of carbureter adjustment effected by manual turning of a ring or handle, whose lower end is connected with the carbureter, and whose upper end is conveniently located on the dash of a motor vehicle.

Figure 1:
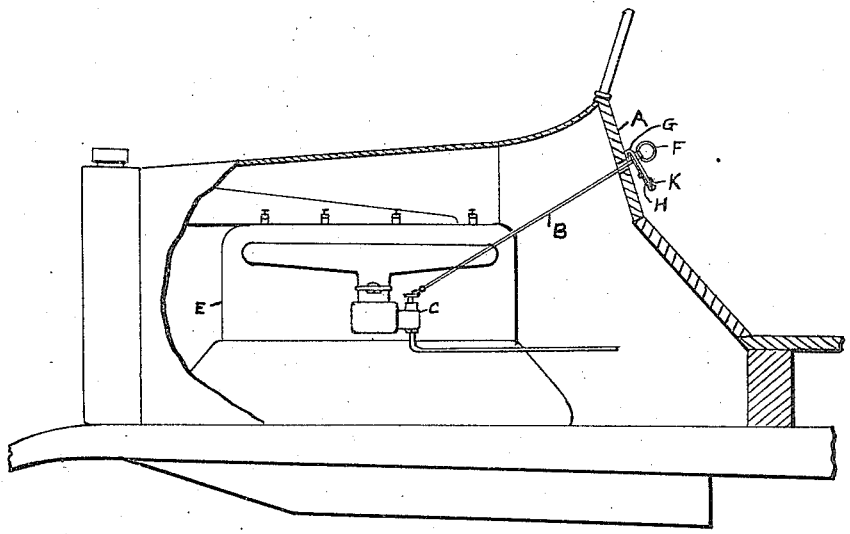
Figure 1 is a side elevation partly in section of the forward part of a motor vehicle showing the relative positioning of my device with respect to the carbureter and to the dash.
Figure 2:
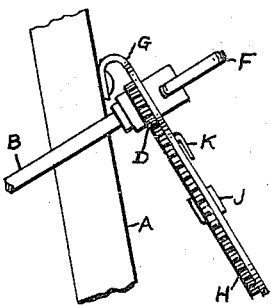
Fig. 2 is an enlarged side elevation of the device, taken from the opposite side of the vehicle from that shown in Fig. 1.
Figure 3:
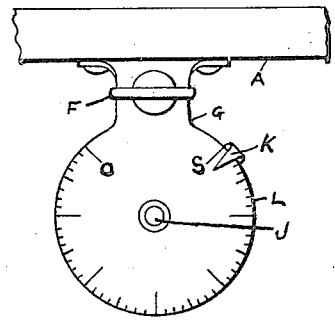
Fig. 3 is a view of the device as seen by a person occupying the driver's seat, designed to particularly bring out the relation of the moving pointer and of the fixed dial.
Figure 5:
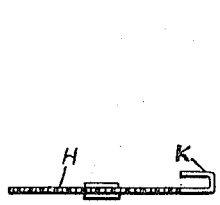
Fig. 5 is an elevational view, taken from a point in the same plane, of the gearing wheel and its attached pointer.
Figure 4:
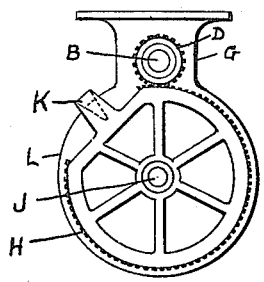
Fig. 4 is a view of the device from beneath, and looking in exactly the opposite direction from that of Fig. 3.

A indicates the dash of a motor vehicle and C the carbureter located in the usual relation to the engine E. Extending from the movable or adjustment portion of the carbureter to a convenient point on the dash is a rod B, whose upper portion has keyed thereto the gear wheel D, and, on its extreme end the ring or handle piece F. The thickened upper portion of the rod B engages rotatably through the supporting plate G, which is screwed to the dash in such a way that the gear wheel D lies immediately beneath or against the under surface thereof, and in such position that its teeth mesh with the teeth of a larger gear wheel H, which is pivoted, by means of the pin J, to the center portion of the plate G, so that the projecting and overengaging tongue K will move relatively to the graduated dial portion L of the plate G when the gear wheel H is rotated. This may be suitably marked and subdivided in any desired manner, so that the degree to which the carbureter adjustment is toward extreme open or closed condition may be easily judged from the relative position of the indicating pointer K with respect to the extremes O and S, meaning of course "open" and "shut" respectively.

The exact proportioning of the sizes of the wheels D and H may of course be determined by the particular conditions of use in each individual case, some carbureters requiring a greater range of adjustment than others. My improvement however is directed to a feature common to all as regards convenience of use, in that, by the proper proportioning of the sizes of the wheels D and H, the usual degree of carbureter adjustment likely to occur while the vehicle is in motion can be easily and quickly effected by the driver while under way by a single twist of the hand, as contrasted with repeated turnings.

What I claim is:

1. In an adjustment gage, the combination of a peripherally graduated plate, a gear wheel rotatably supported therefrom in a plane parallel therewith, said gear wheel having a portion of its periphery formed into an overengaging indicator, a second gear wheel whose teeth mesh with the teeth of the first named gear wheel, and a manually rotatable stem whereon said second gear wheel is keyed, engaging through an extraneously located portion of said plate.

2. An adjustment gage, having in combination with a supporting plate and a rotatable rod engaging therethrough, the lower end of said rod being adapted for connection with a carbureter, a gear wheel carried by said rod adjacent one face of said plate, a second gear wheel rotatably mounted on said plate in position for its teeth to mesh with those of the first named gear wheel, and an indicator carried by said second gear wheel in position to move about the peripheral portion of said supporting plate as said gear wheels are rotated when said rod is manipulated.

3. In an adjustment gage, in combination with a peripherally marked dial, a manually rotatable rod engaging therethrough, a pair of intermeshing gear wheels, one of which is carried on said rotatable rod adjacent one face of said dial and the other of which is pivotally supported by said dial, said last named gear wheel having a portion of its periphery formed as a pointer whose position relatively to the marked portion of the dial shows the degree to which said rod has been rotated.

In testimony whereof, I sign this specification in the presence of two witnesses.

EDWARD C. TAYLOR.

Witnesses:
HARRY F. MCMASTER,
WILLIAM M. SWAN.

Copies of this patent may be obtained for five cents each, by addressing the "Commissioner of Patents, Washington, D. C."